Dec. 12, 1961 A. S. REICHERT 3,012,253
HOSPITAL BEDS
Filed Aug. 11, 1958 5 Sheets-Sheet 1
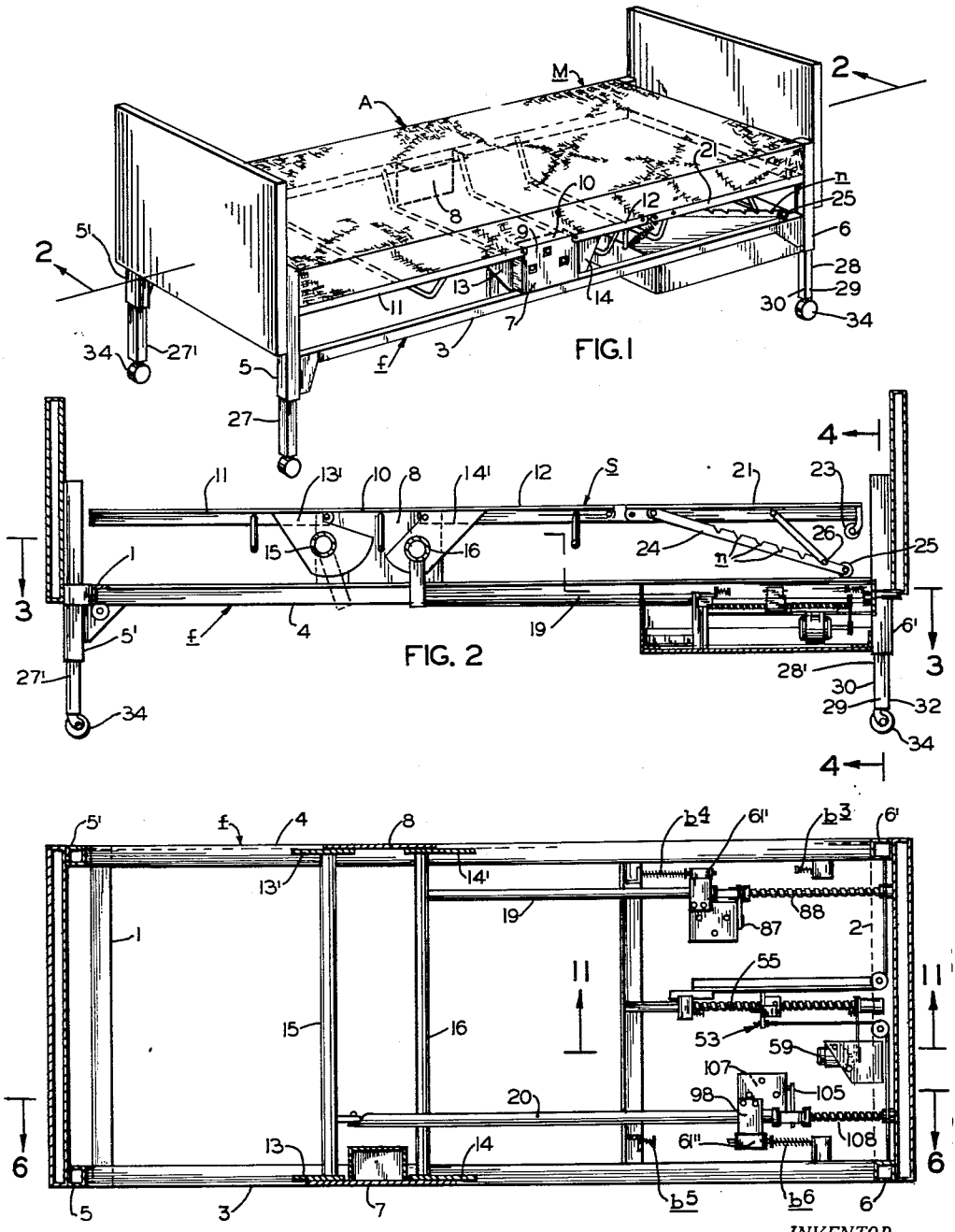
INVENTOR.
ALLAN S. REICHERT
BY
ATT'Y.

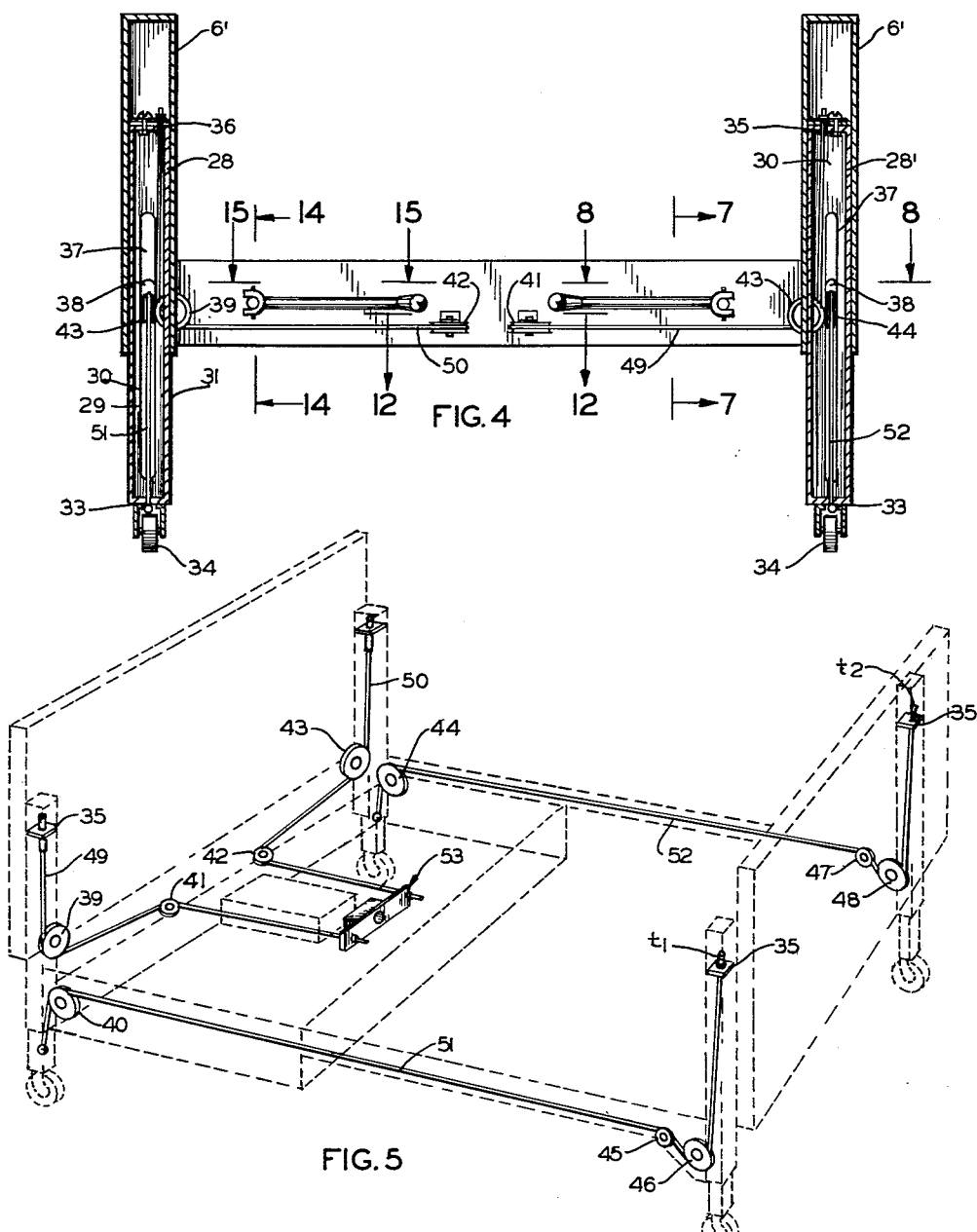

Dec. 12, 1961 A. S. REICHERT 3,012,253
HOSPITAL BEDS
Filed Aug. 11, 1958 5 Sheets-Sheet 3

INVENTOR.
ALLAN S. REICHERT
BY
ATT'Y.

Dec. 12, 1961 A. S. REICHERT 3,012,253
HOSPITAL BEDS
Filed Aug. 11, 1958 5 Sheets-Sheet 4
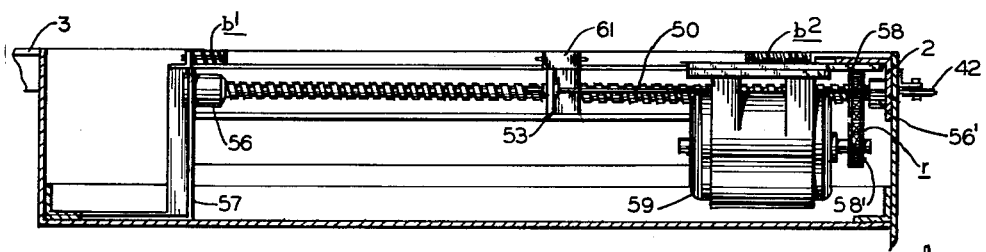
FIG. 11
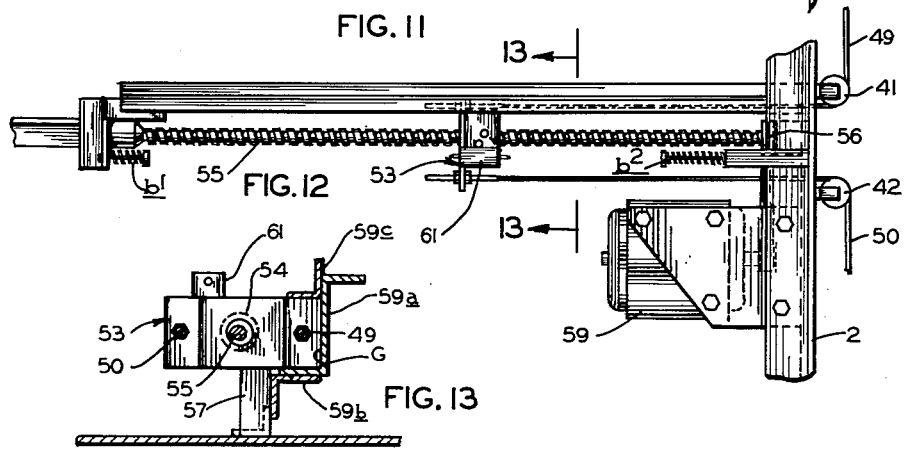
FIG. 12
FIG. 13
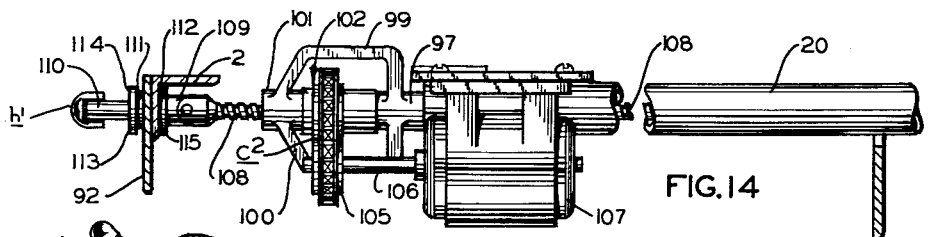
FIG. 14
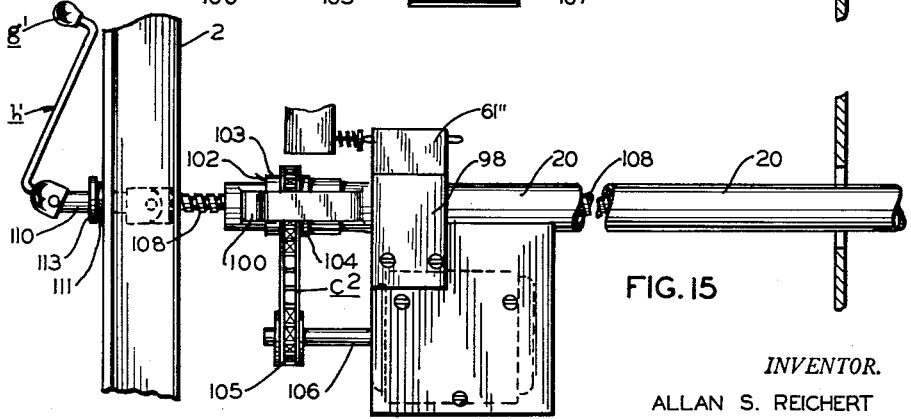
FIG. 15
*INVENTOR.*
ALLAN S. REICHERT
BY
*Alfred W. Petchaft*
ATT'Y.

Dec. 12, 1961  A. S. REICHERT  3,012,253
HOSPITAL BEDS
Filed Aug. 11, 1958  5 Sheets-Sheet 5

*INVENTOR.*
ALLAN S. REICHERT
BY
ATT'Y.

United States Patent Office 3,012,253
Patented Dec. 12, 1961

3,012,253
HOSPITAL BEDS
Allan S. Reichert, Kirkwood, Mo., assignor to Shampaine Industries, Inc., a corporation of Missouri
Filed Aug. 11, 1958, Ser. No. 754,274
1 Claim. (Cl. 5—68)

This invention relates in general to sick-room furniture and more particularly hospital beds.

Invalid beds and hospital beds are ordinarily provided with a spring having a series of hinged sections which can be manually shifted into various relative positions to suit the patient's comfort and need. Moreover, such beds have in the past been so constructed with the spring and mattress in a relatively high fixed level above the floor so as to be convenient for the nurses, doctors and attendants in administering to the patient. In recent years, however, hospitals have been adopting a so-called "high-low bed" which is a bed having telescopic legs and including mechanism for raising and lowering the bed upon such telescopic legs so that the spring and mattress can be positioned at various levels above the floor. Some high-low beds have been developed which are power-driven as illustrated in United States Patent No. 2,827,-641, granted on March 25, 1958. There is, however, a great need for a fully power-driven bed in which the various spring positions, as well as vertical height positions, can be accomplished through power-driven means.

It is, therefore, the primary object of the present invention to provide a power-driven hospital bed which can be adjusted to various spring positions and different horizontal levels so that the patient can sleep or recline in any desired position and at any desired height above the floor within selected limits.

It is also an object of the present invention to provide a power-driven hospital bed of the type stated which can optionally be driven by manual means.

It is a further object of the present invention to provide a power-driven hospital bed which can be controlled by the patient or the attendant easily, conveniently and with a minimum of physical effort and which during movement from one position to another will operate smoothly without jarring the patient.

It is an additional object of the present invention to provide a hospital bed of the type stated which is compact and can be shipped as a factory assembled unit with simple convenient means for the subsequent attachment of a head board and foot board to match any selected furniture combination.

With the above and other objects in view, our invention resides in the novel features of form, construction, arrangement, and combination of parts presently described and pointed out in the claim.

In the accompanying drawings:

FIGURE 1 is a perspective view of a hospital bed, constructed in accordance with and embodying the present invention.

FIGURE 2 is a longitudinal sectional view of the hospital bed taken approximately along line 2—2 of FIGURE 1;

FIGURE 3 is a horizontal sectional view of the hospital bed taken along line 3—3 of FIGURE 2;

FIGURE 4 is a vertical sectional view of the hospital bed taken approximately along line 4—4 of FIGURE 2;

FIGURE 5 is a diagrammatic view illustrating the cable and pulley system forming a part of the present invention;

Figures 7, 9:
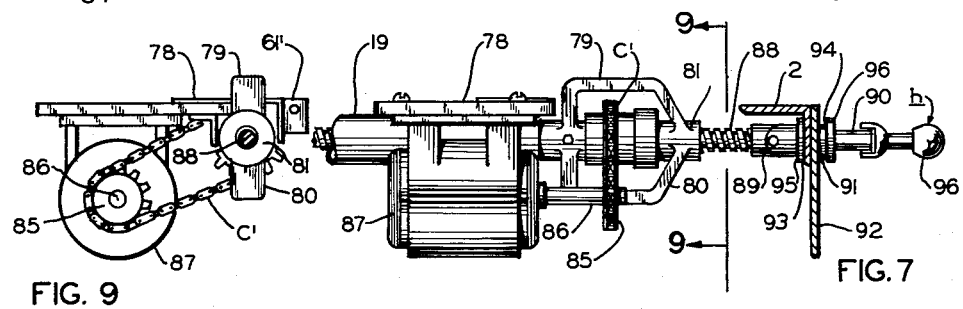
Figure 8:
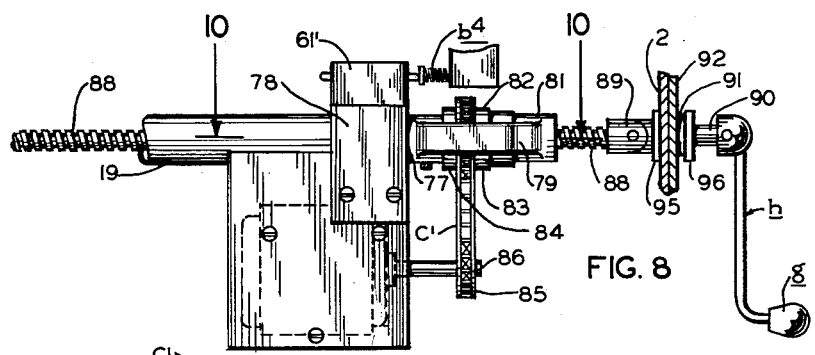
Figure 10:
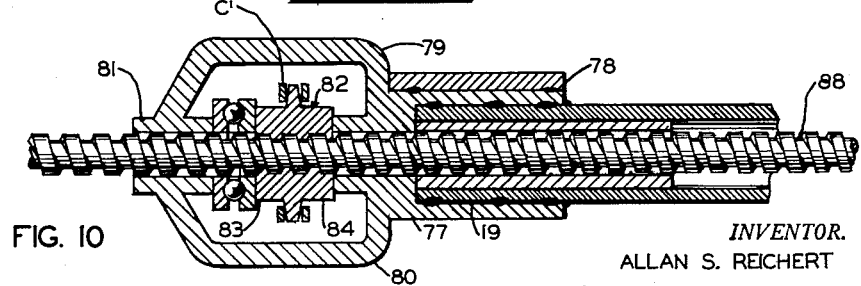
Figure 16:
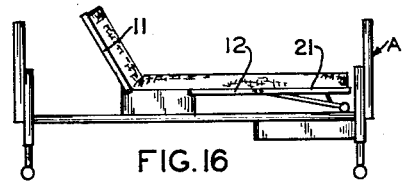
Figure 17:
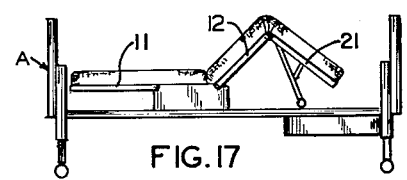
Figure 18:
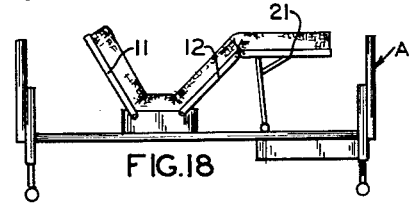
Figure 19:
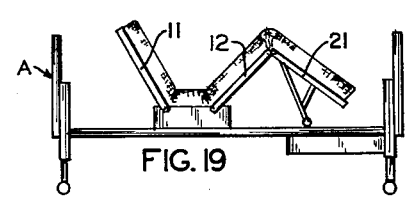
Figure 21:
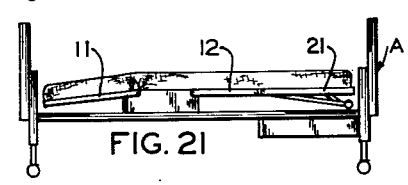
Figure 20:
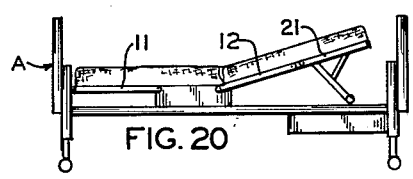
Figure 22:
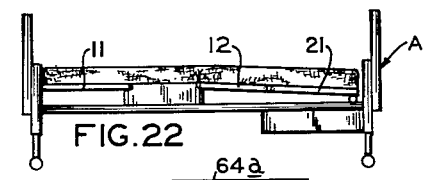
Figure 23:
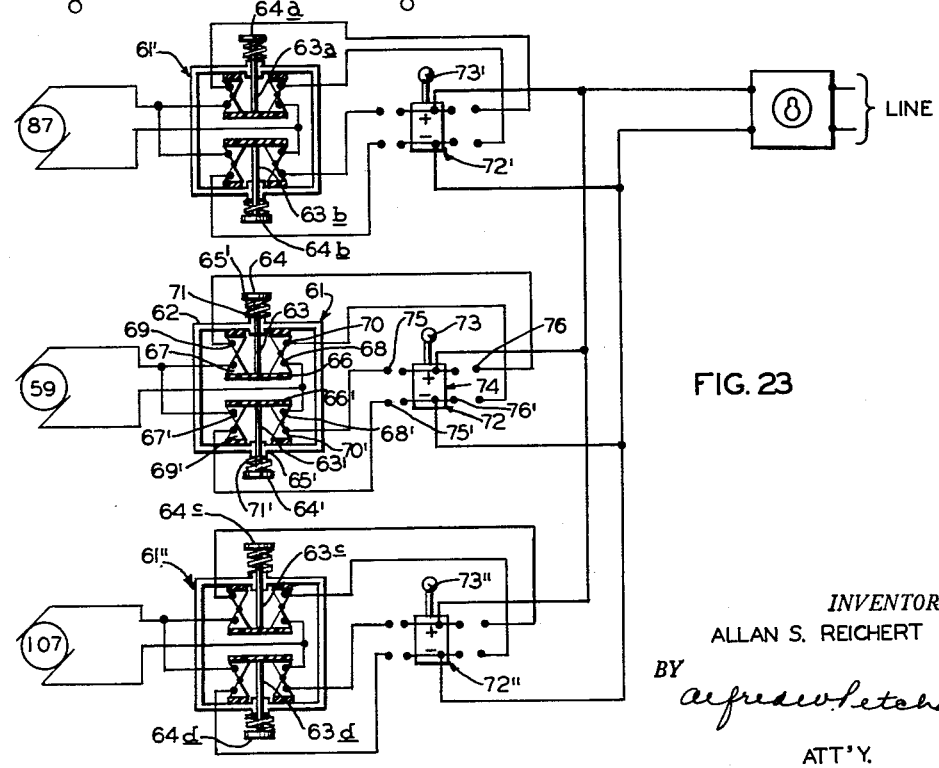

FIGURES 7 and 8 are fragmentary sectional views taken approximately along lines 7—7 and 8—8 of FIGURE 4;

FIGURE 9 is a fragmentary sectional view taken along line 9—9 of FIGURE 7;

FIGURE 10 is a fragmentary sectional view taken approximately along line 10—10 of FIGURE 8;

FIGURE 11 is a fragmentary sectional view taken approximately along line 11—11 of FIGURE 3;

FIGURE 12 is a fragmentary sectional view taken approximately along line 12—12 of FIGURE 4;

FIGURE 13 is a fragmentary sectional view taken approximately along line 13—13 of FIGURE 12;

FIGURE 14 and 15 are fragmentary sectional views taken approximately along lines 14—14 and 15—15 of FIGURE 4;

FIGURES 16–22, inclusive, are diagrammatic side elevational views showing various representative positions into which the hospital bed can be placed; and FIGURE 23 is a wiring diagram showing the connections of the electric components forming a part of the present invention.

Referring now in more detail and by reference characters to the drawings which illustrate a practical embodiment of the present invention, A designates a hospital bed comprising a horizontal rectangular frame $f$ including end rails 1, 2, structurally interconnected in bed-forming relationship by side rails 3, 4, and provided at the four corners with upstanding leg members 5, 5', 6, 6', which are formed of open-bottomed metal tubing having square cross-sectional shape.

Welded to and projecting upwardly from the side rails 3, 4, are side plates 7, 8 which are respectively provided across their top margins with horizontal angle-sections 9, 10. Mounted on and extending horizontally between the side plates 7, 8, are a back section 11 and seat section 12 of an articulated bed spring $s$, the sections 11, 12 being respectively provided with downwardly extending pairs of actuator cranks 13, 13', 14, 14', which pairs are in turn, respectively cross-connected by tubular bars 15, 16. Rigidly connected to the tubular bars 15, 16 respectively are radial extension arms 17, 18 pivotally connected at their lower ends to forwardly extending, more or less, horizontal tubular push rods 19, 20, all as best seen in FIGURES 2 and 3 and for purposes presently more fully appearing.

Figure 6:
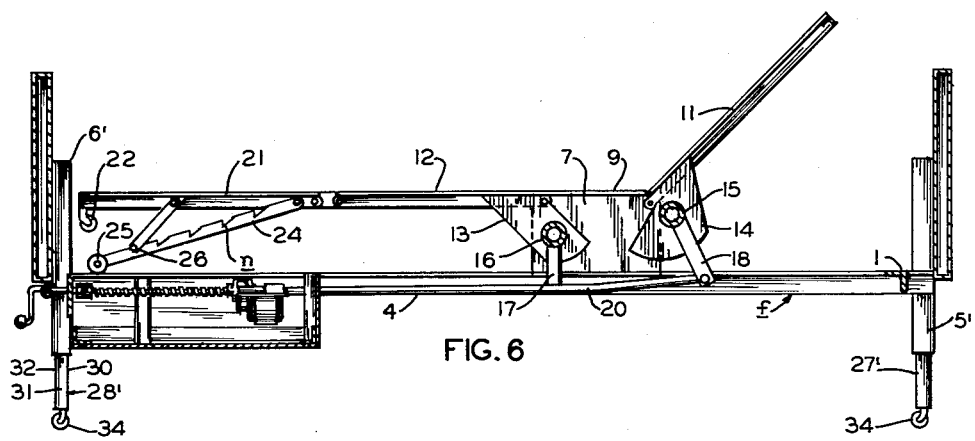
FIGURE 6 is a horizontal sectional view taken approximately along line 6—6 of FIGURE 3.

Pivotally connected to the forward end of the seat-section 12 is a rectangular leg-section 21 provided at its forward corners with depending rollers 22, 23 adapted to ride track-wise over the upper faces of the side rails 3, 4, when the leg-section 21 is in certain selected positions as will presently be more fully described. In addition, the leg-section 21 is hingedly provided with a downwardly swinging support frame 24 having rollers 25 which are spaced laterally outwardly with respect to the rollers 22, 23, and are also adapted to ride track-wise upon the upper faces of the side rails 3, 4. The support frame 24 is also provided with notches $n$ in which a bail 26 may be engaged, as shown in FIGURE 6, to hold the leg-section in various adjusted positions. The back-section 11, the seat-section 12, the leg-section 21, and the space between the top margins of the side plates 7, 8 are conventionally provided with a spring-forming lattice to support a mattress M. Since the lattice may be of any conventional type, it is not specifically shown or described herein.

Operatively disposed in snug-fitting slidable relation within the leg members 5, 5', 6, 6' are tubular legs 27, 27', 28, 28', respectively, each integrally including four walls 29, 30, 31, 32, and being provided adjacent its lower end with a rigidly welded caster-socket 33 for operatively receiving a swiveling caster 34. Each of the legs 27, 27', 28, 28' is provided adjacent its upper end with a rigidly welded plate 35, having a centrally located aperture 36, and the face 30 thereof is provided with an elongated close-ended slot 37 which is aligned with a corresponding slot 38 in the leg members 5, 5', 6, 6'. Respectively journaled within the leg members 5, 5', 6, 6' and upon the side rails 3, 4 are pulleys 39, 40, 43, 44, 45, 46, 47, 48, and on the end rails are pulleys 41, 42, the several pulleys being operatively connected as shown in FIGURE 5 by means of four cables 49, 50, 51, 52. The ends of the cables 49, 50 are secured in the plate 35 of the respective legs 27, 27' while the ends of the cables 51, 52 are adjustably secured to the plates 35 in the legs 28, 28' by means of turnbuckles $t_1$, $t_2$. The cables 49, 50, furthermore, are trained rearwardly around the pulleys 41, 42, and are adjustably secured in a transversely extending horizontal draw-frame 53 having a centrally located nut 54 for threaded engagement with a horizontal driving screw 55 which extends operatively through the nut 54 and is journaled at its rearward end in a thrust bearing 56, mounted on and supported by an upstanding channel 57. At its forward end the screw 55 is journaled in a thrust bearing 56' which is mounted on the inwardly presented vertical face of the end rail 2. Inwardly of the bearing 56' the screw 55 is rigidly provided with a sprocket 58 which is, in turn, operatively connected to a sprocket 58' on the output shaft of a reversible electric gear motor 59 by means of a roller chain $r$. The motor 59 may be of any conventional type and, therefore, is not described in specific detail. Rigidly mounted on and extending rearwardly from the end rail 2 is a guide rail $59^a$ which is joined at its rear end to the upstanding channel 57 by means of a angle shaped connecting member $59^b$. Also secured to the guide rail $59^a$ is a guide rail $59^c$ which forms with the guide rail $59^a$ a U-shaped slideway G which receives the draw-frame 53 and prevents rotation thereof when the screw 55 is turning.

The gear motor 59 is connected by a usual conventional conductor cable 60 to a switch 61 mounted on and carried by the draw-frame 53. The switch 61 is actually a dual limit switch comprising a housing 62 having forwardly and rearwardly extending push-rods 63, 63' provided at their external ends with enlarged bumper pads 64, 64', respectively, for engagement with adjacent spring biased abutment rods $b^1$, $b^2$, of the bed as the draw-frame 53 approaches the desired forward and rearward limits of its travel. The push-rods 63, 63' extend slidably through sleeves 65, 65' into the interior of the housing and are provided at their inner ends with transverse dielectric cross-bars 66, 66' which are, in turn, provided with pairs of oppositely presented contact points 67, 68, 67', 68'. The switch 61 is also interiorly provided with stationary pairs of contact points 69, 70, 69', 70'. The push-rods 63, 63' are biased outwardly by compression springs 71, 71', respectively, so that the contact points 67, 68 are in electrically contactive engagement with the contact points 69, 70, and similarly, the contact points 67', 68' are in electrically contactive engagement with the contact points 69', 70'. Thus, when the bed is in an intermediate height-position both sides of the dual limit switch 61 will be in circuit-closing position. However, if for purposes of explanation it be assumed that the push-rod 63 is associated with "up" movement of the bed and conversely that the push-rod 63' is associated with "down" movement of the bed, then when the bed reaches the upper limit of its travel the bumper-pad 64 will engage the abutment rod $b^1$ and shift the cross-bar 66 into circuit-opening position while the cross-bar 66' remains in circuit-closing position. Contrariwise, when the bed is moving downwardly and reaches the downward limit of its travel, the bumper-pad 64' will engage the abutment rod $b^2$ and shift the cross-bar 66' into circuit-opening position while the cross-bar 66 remains in circuit-closing position.

Associated in the circuit with the switch 61 and operatively mounted on the side plate 7 is a manual control switch 72 having an external handle 73 conveniently located so as to be accessible to the operator or user. The handle is spring-biased to a central or "off" position and can be swung in either direction from such "off" position to shift a two-pole contactor 74 into optional engagement with contact points 75, 76 or 75', 76'. As will be seen by reference to FIG. 23, the contactor 74 is connected to the line or source of electrical energy and, therefore, the switch 72 is in effect a reversing switch since in its alternative positions the polarity of the motor 59 is reversed. It will also be noted that, as long as the cross-bars 66, 66' of the switch 61 are in circuit-closing position, the motor 59 can be caused to rotate in either direction by shifting the handle 73 of the switch 72 in an appropriate direction thereby causing the bed to move up or down as desired. Whenever the handle 73 is released it springs back to "off" position stopping such up or down movement. Similarly, when the bed reaches the upper limit of its travel the switch 61 will assume a corresponding limit position breaking contact with the contact points 69, 70, thereby shutting off the motor 59 and even though the handle 73 of the switch 72 is held in "up" position the bed will go no further. Meanwhile, the contact points 69', 70' are still in contactive engagement with the contact points 67', 68' so that whenever the handle 73 of the switch 72 is shifted to "down" position, the motor 59 will be energized in the reverse direction and the bed will go down. When the bed is moving downwardly and reaches the lower limit of its travel the reverse set of conditions will occur.

The push-rod 19 extends more or less horizontally forwardly and terminates approximately midway between the side plates 7, 8 and the front legs 6, 6'. Rigidly attached to the forward end of the push-rod 19 is a collar 77 which is cast or otherwise integrally formed with a laterally projecting motor-mounting plate 78, and with two diametrally juxtaposed axially projecting arms 79, 80 which are, in turn, integrally connected to and support a bearing collar 81 disposed in forwardly spaced relation to the collar 77. Operatively disposed within the space between the collars 77, 81 is a sprocket-nut 82 having oppositely projecting axial hubs 83, 84, respectively, journaled in the collars 77, 81. It will be noted that the arms 79, 80 are bowed outwardly to provide adequate clearance for the circumference of the sprocket-nut 82 which is connected by a roller chain $c^1$ to a driving sprocket 85 keyed upon the end of a shaft 86 forming the driven shaft of a gear motor 87 rigidly mounted upon and carried by the motor-mounting plate 78. The motor 87 is electrically connected to a switch 61' which is also mounted on and carried by the motor-mounting plate 78. This switch 61' is substantially identical with the previously described switch 61 and is similarly located so that it will be actuated in one direction or the other, as the case may be, when the push-rod 19 reaches either the forward or rearward desired limit of its travel. In this connection, the switch 61' is provided with push-rods $63^a$, $63^b$ having bumper pads $64^a$, $64^b$ which respectively engage spring biased abutment rods $b^3$, $b^4$, the former being somewhat longer than the latter to allow for manual operation of the push-rod 19 beyond extreme position as will be presently more fully discussed. The switch 61' is, furthermore, electrically associated with a manual control switch 72' having a handle 73'. The switch 72' is substantially identical with the previously described control switch 72 and functions in the same manner. Thus, when the handle 73' is left untouched it assumes a central or neutral position and the motor 87 is not energized. However, by pushing the handle 73' to one side the motor 87 will run in one direction and by pushing the handle 73' toward the other side, the motor 87 will run in the other direction.

Operatively mounted in the sprocket-nut 82 and extending axially therethrough is a substantially horizontal jack-screw 88 which has adequate clearance to run in and out of the tubular interior of the push-rod 19 as the sprocket-nut 82 rotates. The direction of relative axial movement between the jack-screw 88 and the push-rod 19 will depend, of course, upon the direction of rotation of the motor 87 which, in turn, is a matter of choice on the part of the operator or user through appropriate manipulation of the control switch 72′. The forward end of the jack-screw 88 is connected by a universal joint 89 to a short drive shaft 90 which is journaled in a bearing 91 mounted in a cross member 92, which is rigidly mounted at its end upon and extends horizontally between the front legs 6, 6′. The bearing 91 is provided upon its forwardly and rearwardly presented vertical ends with thrust faces 93, 94 which operatively engage set-collars 95, 96 fastened upon the shaft 90. Thus, the shaft 90 can rotate operatively in the bearing 91 while taking the thrust-load imposed by the push-rod 19. The shaft 90 extends axially through the bearing 91 and on its forward end is provided with a pivoted handle $h$ which can be swung down out of the way when not in use. The handle $h$ is conventionally provided with a hand-grip $g$. It should be noted in this connection that the friction between the sprocket-nut 82 and the jack-screw 88 is much less than that between the thrust faces 93, 94, and the set collars 95, 96 with the result that the jack-screw 88 will ordinarily not rotate and the sprocket-nut 82 will translate itself and the push-rod 19 forwardly or rearwardly as the motor 87 rotates, depending, of course, upon the direction of rotation of the motor 87. The friction between the set collars 95, 96 and the thrust faces 93, 94, however, is not great enough to impede, seriously, the manual turning of the jack-screw 88 by the handle $h$. The sprocket-nut 82 is held stationary when the motor 87 is de-energized by reason of the usual worm drive mechanism conventionally forming a part of the gear motor 87. Therefore, by turning the handle $h$ the push-rod may shift manually. This alternative is very desirable as a safety measure in case of power failure in the hospital.

Similarly, the push-rod 20 is provided on its forward end with a collar 97 which is similar in all respects to the previously described collar 77 and is integrally provided with a motor-mounting plate 98 and with diametrally opposed axially projecting arms 99, 100, which are, in turn, integrally connected to a bearing collar 101. Operatively disposed within the space between the collars 97, 101 is a sprocket-nut 102 having hubs 103, 104, respectively journaled in the collars 97, 101. Like the sprocket-nut 82, the sprocket-nut 102 is connected by a roller chain $c^2$ to a driving sprocket 105 keyed upon the shaft 106 of a gear motor 107, which, in turn, is rigidly mounted on and carried by the motor-mounting plate 98. The motor 107 is electrically connected to a switch 61″ which is also mounted on and carried by the plate 98. This switch is substantially identical with the switches 61 and 61′ and is located so that it will be actuated in one direction or the other, as the case may be, when the push-rod 20 reaches either the forward or rearward limit of its travel. In this connection the switch 61″ is provided with pushrods $63^c$, $63^d$ which respectively engage spring biased abutment rods $b^5$, $b^6$, the latter being somewhat longer than the former to allow for manual operation of the push-rod 20 beyond extreme position as will be presently more fully discussed. The switch 61″ is, furthermore, electrically associated with a manual control switch 72″ having a handle 73″. The switch 72″ is identical with switches 72, 72′ and functions in the same manner. Operatively mounted in the sprocket-nut 102 and extending axially therethrough is a substantially horizontal jack-screw 108, which is substantially similar in all respects to the previously described jack-screw 88, and has adequate clearance to run in and out of the tubular interior of the push-rod 20 as the sprocket-nut 102 rotates. The direction of relative axial movement between the jack-screw 108 and the push-rod 20 will depend upon the direction of rotation of the motor 107 which, in turn, is a matter of choice on the part of the operator or user through appropriate manipulation of the control switch 72″. The forward end of the jack-screw 108 is connected by a universal joint 109 to a short drive shaft 110 which is journaled in a bearing 111 mounted in the cross member 92. The bearing 111 is also provided upon its forwardly and rearwardly presented vertical faces with thrust faces 112, 113 which operatively engage set collars 114, 115 fastened upon the shaft 110. Thus, the shaft 110 can rotate operatively in the bearing 111 while taking the thrust load imposed by the push-rod 20. The shaft 110 extends axially through the bearing 111 and on its forward end is provided with a pivoted handle $h'$ which can be swung downwardly out of the way when not in use. The handle $h'$ is conventionally provided with a hand-grip $g'$. As previously pointed out in connection with the sprocket-nut 82, the sprocket-nut 102 and the jack-screw 108 move more freely in relation to each other than the shaft 110 and the bearing 111. Consequently, whenever the gear motor 107 is energized sprocket-nut 102 will rotate while the jack-screw 108 remains substantially stationary, so that the sprocket-nut 102 will translate itself and the push-rod 20 forwardly or rearwardly. However, whenever the motor 107 is not energized the friction in the gearing thereof is sufficient to hold the sprocket-nut 102 stationary and if, under certain circumstances, the handle $h'$ is manually rotated, the resulting rotation of the jack-screw 108 will cause the sprocket-nut 102 and the push-rod 20 associated therewith to translate forwardly or rearwardly, depending upon the direction of rotation of the jack-screw 106.

The spring biased abutment bars $b^3$, $b^4$, $b^5$, $b^6$ are constructed with stronger springs than the springs biasing the push-rods $63^a$, $63^b$, $63^c$, $63^d$ in the same manner as a solid abutment. However, if the switches 61, 61″ should, for some unexpected reason, fail to act promptly the spring biased abutment rods will yield and permit some overtravel without damage to any of the mechanism. In addition, and of more importance, is the fact that the yielding character of the abutments bars $b^3$, $b^4$, $b^5$, $b^6$ permits overtravel of the mechanism under manual operation of the handles $h$, $h'$ so that the bed can be placed in so-called Trendelenburg positions and reverse Trendelenburg positions (as shown in FIGS. 21 and 22, respectively) when the condition of the patient requires such.

It should be understood that changes and modifications in the form, construction, arrangement, and combination of the several parts of the hospital beds may be made and substituted for those herein shown and described without departing from the nature and principle of my invention.

Having thus described my invention, what I claim and desire to secure by Letters Patent is:

An actuator mechanism for use with a hospital bed which hospital bed has an articulated mattress-supporting spring including a frame having an articulated section swingably mounted thereon, and an actuator crank operatively attached at one end to said section; said actuator mechanism comprising a tubular push-rod operatively connected to the actuator crank, a yoke rigidly mounted on the other end of the push-rod and including spaced tubular collars connected by arms so that except for the arms the space between the collars is open, a sprocket-nut rotatably mounted in and carried between the collars of the yoke with its sprocket-teeth projecting accessibly through the open spaces of the collars, a screw operatively engaged in said nut and projecting axially through the yoke into the push-rod, means carried by the frame for optionally holding the outwardly projecting end of each screw non-rotatively in relation to the nut, a motor mounted on and carried by said push-rod, said motor having a driving sprocket, a chain connecting the motor-sprocket and the sprocket nut for optionally rotating the nut whereby to cause said push-rod to translate longitudinally along the screw with which it is associated and transmit swinging movement to the actuator crank.

References Cited in the file of this patent

UNITED STATES PATENTS

| | | |
|---|---|---|
| 2,481,477 | Peery | Sept. 6, 1949 |
| 2,605,481 | Burkhart | Aug. 5, 1952 |
| 2,681,454 | Tallman | June 22, 1954 |
| 2,684,488 | Snyder | July 27, 1954 |
| 2,687,536 | Miller | Aug. 31, 1954 |
| 2,747,203 | Dawson | May 29, 1956 |
| 2,802,219 | Travis | Aug. 13, 1957 |
| 2,807,174 | Helsel | Sept. 24, 1957 |
| 2,827,641 | Reichert et al. | Mar. 25, 1958 |